(12) United States Patent
Klein et al.

(10) Patent No.: US 7,078,475 B2
(45) Date of Patent: Jul. 18, 2006

(54) SYNERGISTIC AMINE CHAIN-EXTENDERS IN POLYUREA SPRAY ELASTOMERS

(75) Inventors: Howard P. Klein, Austin, TX (US); Jerry L. Reddinger, Round Rock, TX (US); Kenneth M. Hillman, Georgetown, TX (US)

(73) Assignee: Huntsman Petrochemical Corporation, The Woodlands, TX (US)

( * ) Notice: Subject to any disclaimer, the term of this patent is extended or adjusted under 35 U.S.C. 154(b) by 0 days.

(21) Appl. No.: 10/479,403

(22) PCT Filed: Jun. 11, 2002

(86) PCT No.: PCT/US02/18869

§ 371 (c)(1),
(2), (4) Date: Dec. 2, 2003

(87) PCT Pub. No.: WO02/102869

PCT Pub. Date: Dec. 27, 2002

(65) Prior Publication Data

US 2004/0171786 A1  Sep. 2, 2004

Related U.S. Application Data

(60) Provisional application No. 60/298,470, filed on Jun. 15, 2001.

(51) Int. Cl.
*C08G 18/10* (2006.01)

(52) U.S. Cl. .............................. 528/64; 528/68; 528/78

(58) Field of Classification Search ................... 528/64, 528/68, 78
See application file for complete search history.

(56) References Cited

U.S. PATENT DOCUMENTS

| 3,364,239 | A |   | 1/1968  | Speranza ................. 260/347.7 |
|-----------|---|---|---------|-------------------------------------|
| 3,522,309 | A |   | 7/1970  | Kirby ......................... 260/577 |
| 3,666,788 | A |   | 5/1972  | Rowton ............... 260/465.5 R |
| 3,846,351 | A |   | 11/1974 | Huffaker et al. ...... 260/2.5 AM |
| 3,865,791 | A | * | 2/1975  | Brinkmann et al. ........... 528/73 |
| 3,979,364 | A |   | 9/1976  | Rowton ....................... 528/76 |
| 3,994,975 | A |   | 11/1976 | Oude Alink et al. ........ 564/446 |
| 4,048,106 | A |   | 9/1977  | Hermans .................... 521/129 |
| 4,261,845 | A |   | 4/1981  | Cuscurida ................... 508/552 |
| 4,286,074 | A |   | 8/1981  | Davis et al. ................ 521/137 |
| 4,293,470 | A |   | 10/1981 | Cuscurida ................... 544/401 |
| 4,330,677 | A |   | 5/1982  | Linke et al. ................ 562/583 |
| 4,379,729 | A |   | 4/1983  | Cross ....................... 156/73.6 |
| 4,396,729 | A |   | 8/1983  | Dominquez et al. .......... 521/51 |
| 4,433,067 | A |   | 2/1984  | Rice et al. .................... 521/51 |
| 4,444,910 | A |   | 4/1984  | Rice et al. .................... 521/51 |
| 4,474,900 | A |   | 10/1984 | Dominguez ................. 521/110 |
| 4,474,901 | A |   | 10/1984 | Dominguez ................. 521/163 |
| 4,487,908 | A |   | 12/1984 | Dominguez ................... 528/48 |
| 4,507,090 | A |   | 3/1985  | Kobayashi et al. ........... 440/52 |
| 4,513,133 | A |   | 4/1985  | Dominguez ................... 528/49 |
| 4,521,624 | A |   | 6/1985  | Jackisch .................... 564/446 |
| 4,540,768 | A |   | 9/1985  | Speranza et al. ............. 528/79 |
| 4,578,446 | A |   | 3/1986  | House et al. ................. 528/64 |
| 4,585,850 | A |   | 4/1986  | Dominguez ................. 528/122 |
| 4,607,090 | A |   | 8/1986  | Dominguez ................... 528/48 |
| 4,612,335 | A |   | 9/1986  | Cuscurida et al. .......... 521/167 |
| 4,631,298 | A |   | 12/1986 | Presswood ................... 521/163 |
| 4,663,201 | A |   | 5/1987  | House et al. ............. 427/388.2 |
| 4,683,272 | A |   | 7/1987  | Cuscurida et al. .......... 525/404 |
| 4,705,814 | A |   | 11/1987 | Grigsby, Jr. et al. ........ 521/159 |
| 4,716,193 | A |   | 12/1987 | Grigsby, Jr. ................ 524/730 |
| 4,732,919 | A |   | 3/1988  | Grigsby, Jr. et al. ........ 521/159 |
| 4,736,009 | A |   | 4/1988  | House et al. ................. 528/68 |
| 4,761,465 | A |   | 8/1988  | Speranza et al. ............. 528/45 |
| 4,783,517 | A |   | 11/1988 | Scott, Jr. et al. ............. 528/52 |
| 4,801,674 | A |   | 1/1989  | Scott, Jr. et al. ............. 528/68 |
| 4,806,615 | A |   | 2/1989  | Rice et al. ................... 528/68 |
| 4,806,616 | A |   | 2/1989  | Baumann et al. ............. 528/68 |
| 4,847,347 | A |   | 7/1989  | Baumann et al. ............. 528/68 |
| 4,874,831 | A |   | 10/1989 | House et al. ................. 528/48 |
| 4,897,430 | A |   | 1/1990  | Speranza et al. ........... 521/159 |
| 4,904,751 | A |   | 2/1990  | Speranza et al. ............. 528/45 |
| 4,927,912 | A |   | 5/1990  | Speranza et al. ........... 528/405 |
| 4,946,924 | A |   | 8/1990  | Speranza et al. ........... 528/111 |
| 4,948,861 | A |   | 8/1990  | Baumann et al. ............. 528/68 |
| 4,960,620 | A |   | 10/1990 | House et al. ............. 427/385.5 |
| 5,001,267 | A |   | 3/1991  | Speranza et al. ........... 564/472 |
| 5,008,453 | A |   | 4/1991  | Nalepa et al. .............. 564/271 |
| 5,013,813 | A |   | 5/1991  | Zimmerman et al. ......... 528/60 |
| 5,041,668 | A |   | 8/1991  | Nalepa et al. .............. 564/330 |
| 5,064,927 | A |   | 11/1991 | Davis .......................... 528/64 |
| 5,082,917 | A |   | 1/1992  | Su et al. ....................... 528/68 |
| 5,084,202 | A |   | 1/1992  | Lin et al. ............... 252/183.11 |
| 5,093,528 | A |   | 3/1992  | Dobson et al. ............. 564/472 |
| 5,100,997 | A |   | 3/1992  | Reisch et al. ................. 528/60 |

(Continued)

FOREIGN PATENT DOCUMENTS

| AU | B-39042/89    | 2/1990  |
|----|---------------|---------|
| WO | WO 02/102871  | 12/2002 |

OTHER PUBLICATIONS

"Preparation of N-Alkyl Substituted Poly(oxyalkylene)amines and Their Reactivies Toward Blocked Isocyanates" Ind. Eng. Chem. Res., vol. 36, No. 10 (1987) by Lin et al.

*Primary Examiner*—Rachel Gorr
(74) *Attorney, Agent, or Firm*—Edward Korompai

(57) ABSTRACT

Disclosed are derivatives of isophorone diamine exhibiting a synergistic relationship with other commonly employed chain extenders offering enhanced efficacy with regard to slowing of the polyurea elastomer cure profile, and processes employing their use. According to the invention, extensions of the gel-free and tack-free times are more readily achieved at lower loading levels for these chain extender blends than are afforded through the sole use of the individual molecules.

12 Claims, No Drawings

U.S. PATENT DOCUMENTS

| | | | |
|---|---|---|---|
| 5,124,426 A | 6/1992 | Primeaux, II et al. | 528/60 |
| 5,126,170 A | 6/1992 | Zwiener et al. | 427/385.5 |
| 5,140,090 A | 8/1992 | Champion et al. | 528/60 |
| 5,153,232 A | 10/1992 | Primeaux, II | 521/110 |
| 5,162,388 A | 11/1992 | Primeaux, II | 521/159 |
| 5,171,819 A | 12/1992 | Su et al. | 528/73 |
| 5,189,073 A | 2/1993 | Humbert et al. | 521/110 |
| 5,189,075 A | 2/1993 | Zimmerman et al. | 521/159 |
| 5,218,005 A | 6/1993 | Zimmerman et al. | 521/58 |
| 5,223,551 A | 6/1993 | Gattuso et al. | 521/163 |
| 5,236,741 A | 8/1993 | Zwiener et al. | 427/385.5 |
| 5,243,012 A | 9/1993 | Wicks et al. | 528/58 |
| 5,248,821 A | 9/1993 | Lin et al. | 564/55 |
| 5,266,671 A | 11/1993 | Primeaux, II | 528/68 |
| 5,288,768 A | 2/1994 | Gattuso et al. | 521/163 |
| 5,312,886 A | 5/1994 | House et al. | 528/64 |
| 5,317,076 A | 5/1994 | Primeaux, II | 528/61 |
| 5,362,913 A | 11/1994 | Knifton | 564/480 |
| 5,422,042 A | 6/1995 | Waddill et al. | 525/407 |
| 5,442,034 A | 8/1995 | Primeaux, II | 528/60 |
| 5,470,890 A | 11/1995 | House et al. | 521/128 |
| 5,480,955 A | 1/1996 | Primeaux, II | 528/60 |
| 5,489,704 A | 2/1996 | Squiller et al. | 560/35 |
| 5,504,181 A | 4/1996 | Primeaux, II | 528/60 |
| 5,529,739 A | 6/1996 | Johnsson et al. | 264/300 |
| 5,554,586 A | 9/1996 | Pratt | 508/552 |
| 5,561,200 A | 10/1996 | Yonek et al. | 528/45 |
| 5,616,677 A | 4/1997 | Primeaux, II et al. | 528/66 |
| 5,623,045 A | 4/1997 | Zwiener et al. | 528/68 |
| 5,700,846 A | 12/1997 | Grigsby, Jr. et al. | 521/128 |
| 5,731,397 A | 3/1998 | Primeaux, II et al. | 528/73 |
| 5,759,695 A | 6/1998 | Primeaux, II | 428/425.5 |
| 5,817,876 A | 10/1998 | Maurer et al. | 564/397 |
| 5,852,154 A | 12/1998 | Gras et al. | 528/61 |
| 5,962,144 A | 10/1999 | Primeaux, II | 428/425.5 |
| 5,962,618 A | 10/1999 | Primeaux, II et al. | 528/61 |
| 6,005,062 A | 12/1999 | Hansen et al. | 528/68 |
| 6,013,755 A | 1/2000 | Primeaux, II et al. | 528/68 |
| 6,169,141 B1 | 1/2001 | Kurek et al. | 524/589 |
| 6,180,181 B1 | 1/2001 | Verardi et al. | 427/409 |
| 6,180,745 B1 | 1/2001 | Roesler | 528/59 |
| 6,221,998 B1 | 4/2001 | Okuhira et al. | 528/68 |
| 6,291,019 B1 | 9/2001 | Locke et al. | 427/385.5 |
| 6,313,260 B1 | 11/2001 | Gruning et al. | 528/310 |
| 6,346,204 B1 | 2/2002 | Eling | 252/182.24 |
| 6,355,829 B1 | 3/2002 | Roesler et al. | 560/25 |
| 6,369,189 B1 | 4/2002 | Naderhoff et al. | 528/49 |
| 6,399,736 B1 | 6/2002 | Primeaux, II et al. | 528/84 |
| 6,403,752 B1 | 6/2002 | House et al. | 528/64 |
| 6,403,753 B1 | 6/2002 | Loy et al. | 528/73 |
| 6,417,241 B1 | 7/2002 | Huygens et al. | 521/137 |
| 6,436,477 B1 | 8/2002 | Laginess et al. | 427/372.2 |
| 6,437,059 B1 | 8/2002 | Tan et al. | 525/528 |
| 6,451,874 B1 | 9/2002 | Purgett et al. | 523/172 |
| 6,458,293 B1 | 10/2002 | Roesler et al. | 252/182.23 |
| 6,469,199 B1 | 10/2002 | Hansen et al. | 560/169 |
| 6,482,333 B1 | 11/2002 | Roesler et al. | 252/182.12 |
| 6,504,073 B1 | 1/2003 | Ushio et al. | 585/475 |
| 6,521,718 B1 | 2/2003 | Goeb et al. | 525/455 |
| 6,559,274 B1 | 5/2003 | Gertzmann et al. | 528/328 |
| 6,573,398 B1 | 6/2003 | Hansen et al. | 560/19 |
| 6,590,066 B1 | 7/2003 | Roesler | 528/328 |
| 6,605,684 B1 | 8/2003 | Primeaux, II et al. | 528/68 |
| 6,613,389 B1 | 9/2003 | Li et al. | 427/388.1 |
| 6,613,864 B1 | 9/2003 | Porter et al. | 528/58 |
| 6,617,032 B1 | 9/2003 | Rickner et al. | 428/423.3 |
| 2002/0119171 A1 | 8/2002 | Gruning et al. | 424/401 |
| 2002/0123593 A1 | 9/2002 | Milhem | 528/44 |
| 2003/0018124 A1 | 1/2003 | Barsotti et al. | 525/64 |
| 2003/0036585 A1 | 2/2003 | Purgett et al. | 523/172 |
| 2003/0047836 A1 | 3/2003 | Rickner et al. | 264/235 |
| 2003/0049458 A1 | 3/2003 | Rickner et al. | 428/423.1 |
| 2003/0083396 A1 | 5/2003 | Ylitalo et al. | 522/74 |
| 2003/0105220 A1 | 6/2003 | Gupta et al. | 524/589 |
| 2003/0109664 A1 | 6/2003 | Adams et al. | 528/44 |

* cited by examiner

SYNERGISTIC AMINE CHAIN-EXTENDERS IN POLYUREA SPRAY ELASTOMERS

CROSS-REFERENCES TO RELATED APPLICATIONS

This application claims priority to U.S. Provisional Patent Application Ser. No. 60/298,470 filed Jun. 15, 2001.

FIELD OF THE INVENTION

The present invention relates to polyurea spray elastomer technology. More particularly, it relates to controlling the speed of the reaction by which polyurea is formed from an organic isocyanate and an organic polyamine, such as a diamine.

BACKGROUND INFORMATION

In plural-component polyurea spray elastomer technology, it is usually necessary to govern the speed of reaction, for practical reasons. Generally, the slowing of polyurea systems is accomplished via the use of specialized diamines that can delay the onset of cure through a combination of steric and electronic factors. The diamines are typically low-molecular weight cyclic species and are commonly referred to as chain extenders by those skilled in the art of polyurea elastomer technology.

The current state of the art polyurea elastomer technology utilizes low-molecular weight secondary amine chain extenders to tailor the speed of polyurea spray elastomer systems. Presently, UNILINK® 4200 from UOP is the main chain extender employed to extend gel and tack-free times. This product is relatively high in cost at ~$4.50–5.00/lb, and has proven cost prohibitive in some circumstances. An aliphatic version of UNILINK® 4200 is available from UOP under the tradename CLEARLINK® 1000, as well.

SUMMARY OF THE INVENTION

We have found that derivatives of isophorone diamine exhibit a synergistic relationship with other commonly employed chain extenders and offer enhanced efficacy with regard to slowing of the polyurea elastomer cure profile. According to the invention, extensions of the gel-free and tack-free times are more readily achieved at lower loading levels for these chain extender blends than are afforded through the sole use of the individual molecules.

We have discovered synergistic effects when a derivative of isophorone diamine (XTA-754) is combined with other chain extenders (i. e. ETHACURE® 100 and UNILINK® 4200) typically utilized in polyurea spray elastomer formulations. The use of XTA-754 blends offers enhanced efficacy with regard to slowing of the polyurea elastomer cure profile than can be achieved under similar loading of the individual chain extenders when used by themselves.

DETAILED DESCRIPTION

This invention relates to polyurea spray elastomers based upon plural component coating technology. The resulting polyurea spray elastomer materials are derived from reaction between an isocyanate component (A) and amine resin component (B).

The (A) component, or isocyanate component, may consist of any number of suitable aromatic or aliphatic-based prepolymers or quasi-prepolymers. These are standard isocyanate compositions known to those skilled in the art. Preferred examples include MDI-based quasi-prepolymers such as those available commercially as RUBINATE® 9480, RUBINATE® 9484, and RUBINATE® 9495 from Huntsman International, LLC. The isocyanates employed in component (A) can include aliphatic isocyanates of the type described in U.S. Pat. No. 4,748,192. These include aliphatic di-isocyanates and, more particularly, are the trimerized or the biuretic form of an aliphatic di-isocyanate, such as hexamethylene di-isocyanate ("HDI"), or the bi-functional monomer of the tetraalkyl xylene di-isocyanate, such as the tetramethyl xylene di-isocyanate. Cyclohexane di-isocyanate is also to be considered a useful aliphatic isocyanate. Other useful aliphatic polyisocyanates are described in U.S. Pat. No. 4,705,814. They include aliphatic di-isocyanates, for example, alkylene di-isocyanates with 4 to 12 carbon atoms in the alkylene radical, such as 1,12-dodecane di-isocyanate and 1,4-tetramethylene di-isocyanate. Also useful are cycloaliphatic di-isocyanates, such as 1,3 and 1,4-cyclohexane di-isocyanate as well as any mixture of these isomers, 1-isocyanato-3,3,5-trimethyl-5-isocyanatomethyl-cyclohexane (isophorone di-isocyanate); 4,4'-,2,2'- and 2,4'-dicyclohexylmethane di-isocyanate as well as the corresponding isomer mixtures, and the like. All patents mentioned in this specification are herein incorporated by reference thereto.

A wide variety of aromatic polyisocyanates may also be used to form a foamed polyurea elastomer according to the present invention. Typical aromatic polyisocyanates include p-phenylene di-isocyanate, polymethylene polyphenylisocyanate, 2,6-toluene di-isocyanate, dianisidine di-isocyanate, bitolylene di-isocyanate, naphthalene-1,4-di-isocyanate, bis(4-isocyanatophenyl)methane, bis(3-methyl-3-iso-cyanatophenyl)methane, bis(3-methyl-4-isocyanatophenyl)methane, and 4,4'-diphenylpropane di-isocyanate. Other aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979. Usually methylene-bridged polyphenyl polyisocyanate mixtures contain about 20 to about 100 weight percent methylene di-phenyl-di-isocyanate isomers, with the remainder being polymethylene polyphenyl di-isocyanates having higher functionalities and higher molecular weights. Typical of these are polyphenyl polyisocyanate mixtures containing about 20 to about 100 weight percent di-phenyl-di-isocyanate isomers, of which about 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979. One preferred aromatic polyisocyanate is methylene bis(4-phenylisocyanate) or MDI. Pure MDI, quasi-prepolymers of MDI, modified pure MDI, etc. are useful to prepare suitable elastomers. Since pure MDI is a solid and, thus, often inconvenient to use, liquid products based on MDI or methylene bis(4-phenylisocyanate) are also useful herein. U.S. Pat. No. 3,394,164 describes a liquid MDI product. More generally, uretonimine modified pure MDI is included also. This product is made by heating pure distilled MDI in the presence of a catalyst. The liquid product is a mixture of pure MDI and modified MDI. Of course, the term isocyanate also includes quasi-prepolymers of isocyanates or polyisocyanates with active hydrogen containing materials. Any of the isocyanates mentioned above may be used as the isocyanate component in the present invention, either alone or in combination with other aforementioned isocyanates.

The (B) component, or amine resin component, typically consists of a blend comprised of mid- to high-molecular weight polyether amines, low-molecular weight amine chain extenders, and other optional additives such as pigments, adhesion promoters, and light stabilizers. The polyetheramines serve as the mid- to high-molecular weight amine components and are a key building block in the polyurea coating's soft block segments. In the preferred embodiment, suitable polyether amines include those commercially available from Huntsman Petrochemical Corporation of The Woodlands, Tex., and include without limitation JEFFAMINE® D-230, JEFFAMINE® D-400, JEFFAMINE® D-2000, JEFFAMINE® T-403 and JEFFAMINE® T-5000 amines. Generally, polyetheramines useful as a portion of the amine component according to the present invention are described by the formula:

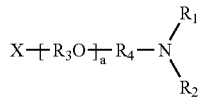

in which $R_1$ and $R_2$ are each independently selected from the group consisting of: hydrogen; an alkyl group having 1, 2, 3, 4, 5, or 6 carbon atoms, whether straight-chain or branched; or a radical of the formula:

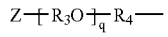

in which $R_3$ in each occurrence may be an alkyl group having any number of carbon atoms selected from 1, 2, 3, 4, 5, or 6, straight-chain or branched; $R_4$ in each occurrence is a straight-chain or branched alkyl bridging group having 1, 2, 3, 4, 5, or 6 carbon atoms; Z is a hydroxy group or alkyl group containing 1, 2, 3, 4, 5, or 6 carbon atoms, straight-chain or branched; q is any integer between 0 and 400; and wherein X is any of:

i) a hydroxy group or an alkyl group having any number of carbon atoms selected from 1, 2, 3, 4, 5, or 6; or

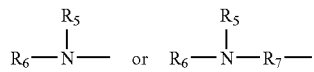

ii) a group $R_6$—N— or $R_6$—N—$R_7$— in which $R_5$ and $R_6$ are each independently selected from the group consisting of: hydrogen; an alkyl group having 1, 2, 3, 4, 5, or 6 carbon atoms, whether straight-chain or branched; or

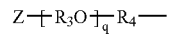

as defined above in which Z is a hydroxy group or an alkoxy group having 1, 2, 3, 4, 5, or 6 carbon atoms, and in which $R_7$ is a straight-chain or branched alkylene bridging group having 1, 2, 3, 4, 5, or 6 carbon atoms; or iii) a moiety of the formula:

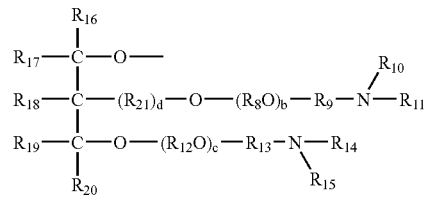

in which $R_{10}$, $R_{11}$, $R_{14}$, and $R_{15}$ are each independently selected from the group of: hydrogen; an alkyl group having 1, 2, 3, 4, 5, or 6 carbon atoms, straight-chain or branched; the moiety

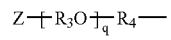

as defined above in which Z is a hydroxy or alkoxy group having 1, 2, 3,4, 5, or 6 carbon atoms; $R_8$ and $R_{12}$ are each independently alkyl groups having 1, 2, 3, 4, 5, or 6 carbon atoms, straight-chain or branched; $R_9$, $R_{13}$, and $R_{21}$ are each independently selected from a straight-chain or branched alkyl bridging linkage having 1, 2, 3, 4, 5, or 6 carbon atoms; $R_{16}$, $R_{17}$, $R_{18}$, $R_{19}$, $R_{20}$ are each independently selected from hydrogen or an alkyl group having 1, 2, 3, 4, 5, or 6 carbon atoms; d is 0 or 1; a is any integer between 0 and 100, with the proviso that when X is a moiety of the formula given in iii) above, b and c may each independently be any integer in the range of 0 to 390, and the sum of a+b+c is any number between 2 and 400.

In the practice of this invention, a single high molecular weight amine-terminated polyol may be used. Also, mixtures of high molecular weight amine terminated polyols, such as mixtures of di- and tri-functional materials and/or different molecular weight or different chemical composition materials, may be used. Also, high-molecular weight, amine-terminated polyethers or simply polyether amines may be included in component (A) and may be used alone or in combination with the aforestated polyols. The term high molecular weight is intended to include polyether amines having a molecular weight of at least about 200. Particularly preferred are the JEFFAMINE® series of polyether amines available from Huntsman Petrochemical Corporation, and include without limitation JEFFAMINE® D-230, JEFFAMINE® D-400, JEFFAMINE® D-2000, JEFFAMINE® T-403 and JEFFAMINE® T-5000 amines. These polyether amines are described with particularity in Huntsman Petrochemical Corporation's product brochure entitled "THE JEFFAMINE® POLYOXYALKYLENEAMINES." Any of the amines specifically mentioned or otherwise described above may be used as the amine component in the present invention, either alone or in combination with other aforementioned amines.

The chain extenders utilized can include both aromatic and aliphatic molecules commonly employed in the current polyurea technology. It is also quite useful to use blends of chain extenders to tailor the gel-free and tack-free times of the resulting polyurea elastomers. Generally, these chain extenders include the products available commercially as XTA-754 from Huntsman Petrochemical Corporation, ETHACURE® 100 and ETHACURE® 300 from Albemarle Corporation, and UNILINK® 4200 from UOP Corporation. The chain extenders useful in this invention include, for example, XTA-754, 1-methyl-3,5-diethyl-2,4-diaminobenzene, 1-methyl-3,5-diethyl-2,6-diaminobenzene (both of these materials are also called diethyltoluene diamine or DETDA and are commercially available as ETHACURE® 100 from the Albemarle Corporation, Baton Rouge, La.), 4,4'-bis(sec-butylamino)diphenylmethane (commercially available as UNILINK® 4200, a product of UOP Corporation), and 1,3,5-triethyl-2,6-diaminobenzene,3,5,3',5'-tetraethyl-4,4'-diaminodiphenylmethane and the like. Particularly preferred aromatic diamine chain extenders are 1-methyl-3,5-diethyl-2,4-diaminobenzene or a mixture of this compound with 4,4'-bis(sec-butylamino)diphenylmethane or 1-methyl-3,5-diethyl-2,6-diaminobenzene. It is entirely within the scope of this invention to include some aliphatic chain extender materials as described in U.S. Pat. Nos. 4,246,363, 4,269,945, and 5,470,890. Other chain extenders include 4,4'-bis(sec-butylamino), di(methylthio)-toluene diamine (commercially available as ETHACURE® 300, a product of Albemarle Corporation) or N,N'-bis(t-butyl)ethylenediamine, each of which can be used alone or, preferably, in combination with 1-methyl-3,5-diethyl-2,4-diaminobenzene or 1-methyl-3,5-diethyl-2,6-diaminobenzene. The aforementioned combination includes from about 1 to about 99 parts of 4,4'-bis(sec-butylamino)diphenylmethane, di(methylthio)-toluene diamine, or N,N'-bis(t-butyl)ethylene-diamine to about 99 to about 1 parts of DETDA.

In the field of aromatic polyurea spray elastomers, ETHACURE® 100 has become the most widely employed chain extender due to a cost/performance balance. However, polyurea spray formulations employing ETHACURE® 100 as the sole chain extender typically exhibit extremely short gel and tack-free times, and often result in coatings exhibiting an "orange-peel" morphology. To slow such aromatic polyurea spray elastomers, UNILINK® 4200 can be incorporated into the formulation. However, the high relative cost of UNILINK® 4200 often limits the levels of its inclusion, and thus, imparts a practical ceiling as to how slow a polyurea spray formulation can be made.

We have discovered that extensions of gel and tack-free times are afforded by the inclusion of a derivative of isophorone diamine (Huntsman's XTA-754) in aromatic polyurea spray formulations. The derivative of isophorone diammine may be prepared by reacting isophorone diamine with a carbonyl compound under reductive

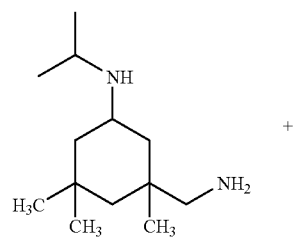

+

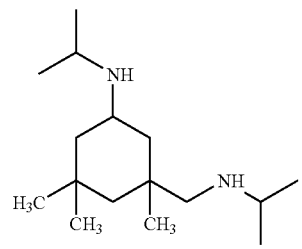

conditions using hydrogen, thus:

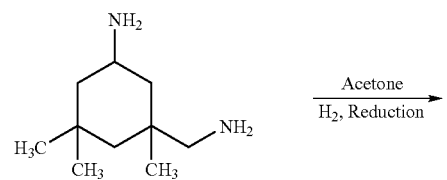

in the case of acetone, to produce a mixture of amines which comprise a novel isophorone derivative useful in accordance with providing a polyurea of the present invention. The mixture of amines on the product side of the equation above is, for purposes of the present specification and the appended claims, conveniently thought of as N-mono- and N,N'-di-isopropyl isophorone diamines, and collectively referred to as "N, isopropyl isophorone diamine". This definition of "N-isopropyl isophorone diammine" includes the mono-2-propylated and the di-2-propylated materials, and all mixtures thereof, irrespective of their relative proportions in the case of mixtures.

In general, it is preferable to use a N-isopropyl isophorone diammine having the highest amount of the N,N'-di-isopropyl isophorone diamine represented by the second structure in the equation above. A particularly useful N, 2-propylated isophorone diammine is available from Huntsman Petrochemical Corporation of The Woodlands, Tex. under the designation of "XTA-754", which contains any desired amount between 80.00–99.99% by weight of N,N'-di-isopropyl isophorone diamine based upon the total weight of the XTA-754, with the balance being mono-propylated material.

In a general sense, the reaction product from the reductive amination reaction above will comprise a mixture of mono-alkylated and di-alkylated isophorone diamines, which may be represented by the structures:

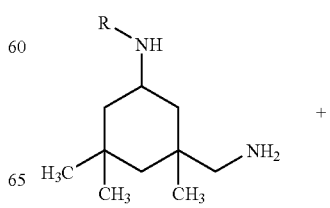

+

-continued

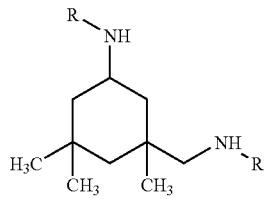

in which R may represent any pendant group selected from the group consisting of: methyl; ethyl; 1-propyl; 1-butyl; 1-pentyl; 4-methyl-2-pentyl; 2-propyl; 2-butyl; 2-methyl-1-propyl; and cyclohexyl. According to the most preferred form of the invention, such a reaction product mixture comprises the N,N'-di-substituted material in any amount between 80.00% and 99.99%, including every hundredth percentage therebetween, by weight based upon the total weight of the mixture. More preferably, such a reaction product mixture comprises the N,N'-di-substituted material in any amount between 90.00% and 99.99% by weight based upon the total weight of the mixture. More preferably still, such a reaction product mixture comprises the N,N'-di-substituted material in an amount of at least 98.00% by weight based upon the total weight of the mixture. To produce a substituted isophorone diamine having R as methyl, ethyl, 1-propyl, 1-butyl or 1-pentyl, one conducts a reductive amination with isophorone diamine in the presence of hydrogen and formaldehyde, acetaldehyde, propionaldehyde, butyraldehyde or pentanaldehyde, respectively. To produce a substituted isophorone diamine having R as 4-methyl-2-pentyl, 2-butyl, 2-propyl, 2-methyl-1-propyl, and cyclohexyl one conducts a reductive amination with isophorone diamine in the presence of hydrogen and methylisobutyl ketone, methylethyl ketone, acetone, isobutyraldehyde, and cyclohexanone, respectively.

We have discovered that extensions of gel and tack-free times are afforded by the inclusion of this derivative in aromatic polyurea spray formulations. When used in conjunction with the fast-reacting ETHACURE® 100, a predictable and linear extension of gel and tack-free times is achieved. However, it should be noted that a threshold point with regard to XTA-754 concentration in the blend is encountered beyond which gel and tack-free times shorten and noticeable texturing of the coating occurs.

An apparent synergy also exists between XTA-754 and UNILINK® 4200 in polyurea spray elastomer formulations. Under similar loading, gel and tack-free times are extended beyond those which are encountered when utilizing UNILINK® 4200 as the sole decelerant. In practical use UNILINK® 4200 can be added as a supplemental chain extender to further slow a polyurea formulation beyond the inherent threshold point encountered with the optimum ETHACURE® 100/XTA-754 blend. It is expected that XTA-754 will compete as well with CLEARLINK® 1000, which is used in aliphatic polymeric coatings having good color and uv resistance.

The (A) component and (B) component of the present polyurea elastomer system are combined or mixed under high pressure; most preferably, they are impingement-mixed directly in the high-pressure equipment, which is, for example, a GUSMER®H-V proportioner (or a GUSMER® UR-H-2000) fitted with a GUSMER® Model GX-7 spray gun where open-mold work or coating is desired. The ratios of these components are adjusted such that they are processed at a 1:1 volume ratio at an index between 0.9 and 1.20. These systems can be processed within a pressure range of 1000–3500 psi and a temperature range of 120–180° F. with preferred processing conditions including pressures between 1500–2500 psi and temperature of 140–170° F.

Thus, the useful temperature range at which a flexible polyurea may be prepared according to the invention is any temperature between 120–180° F. The useful pressure range at which a polyurea may be prepared according to the invention is any pressure between 1000–3500 psi. However, one of ordinary skill recognizes that temperatures and pressures outside these ranges are also useful; thus the present invention is not necessarily limited to being practiced within these parameters.

Surprisingly, it has been found that the XTA-754 exhibits a synergistic relationship between other commonly employed chain extenders and offers enhanced efficacy with regard to slowing of the polyurea elastomer cure profile. Hence, gel and tack-free extensions are more readily achieved at lower loading levels for these chain extender blends than are afforded through the sole use of the individual molecules.

For all the spray work described in the examples which follow, a GUSMER® Marksman proportioning unit (plural component) was used, fitted with a GUSMER® GX-7-400 spray gun. The equipment was set so as to process each example at an isocyanate to resin blend volume ratio of 1.00. Spray processing pressure was maintained at 1500 psi to 2500 psi on both the isocyanate and resin blend components. Block heat, as well as hose heat, was set at 160° F.

EXAMPLE 1

Comparative Example

The (A) component of a spray polyurea elastomer consisted of 108.4 parts of quasi-prepolymer, RUBINATE® 9480. The (B) component was prepared by combining 55.0 parts of JEFFAMINE® D-2000, 5.0 parts of JEFFAMINE® T-5000, 18.0 parts of ETHACURE® 100, and 18.0 parts of UNILINK® 4200. The (A) and (B) components were mixed in the high-pressure, high-temperature, impingement-mix spray equipment, at an (A):(B) weight ratio of 1.12 and a volumetric ratio of 1.00. The resulting polyurea elastomer was sprayed onto a flat metal substrate coated with a sodium oleate based external mold release agent. A good coating resulted exhibiting a 7.0 second gel time, and a 12.5 second tack-free time.

EXAMPLE 2

The (A) component of a spray polyurea elastomer consisted of 101.71 parts of quasi-prepolymer, RUBINATE® 9480. The (B) component was prepared by combining 48.0 parts of JEFFAMINE® D-2000, 9.0 parts of JEFFAMINE® T-5000, 20.0 parts of XTA-754, 9.0 parts of ETHACURE® 100. The (A) and (B) components were mixed in the high-pressure, high-temperature, impingement-mix spray equipment, at an (A): (B) weight ratio of 1.16 and a volumetric ratio of 1.00. The resulting polyurea elastomer was sprayed onto a flat metal substrate coated with a sodium oleate based external mold release agent. A good coating resulted exhibiting a 4.5 second gel time, and an 8 second tack-free time.

EXAMPLE 3

The (A) component of a spray polyurea elastomer consisted of 101.71 parts of quasi-prepolymer, RUBINATE® D 9480. The (B) component was prepared by combining 50.0 parts of JEFFAMINE® D-2000, 10.0 parts of JEFFAMINE® T-5000, 15.0 parts of XTA-754, 13.25 parts of ETHACURE® 100. The (A) and (B) components were mixed in the high-pressure, high-temperature, impingement-mix spray equipment, at an (A):(B) weight ratio of 1.15 and a volumetric ratio of 1.00. The resulting polyurea elastomer was sprayed onto a flat metal substrate coated with a sodium oleate based external mold release agent. A good coating resulted exhibiting a 7.0 second gel time, and a 13.0 second tack-free time.

EXAMPLE 4

The (A) component of a spray polyurea elastomer consisted of 96.81 parts of quasi-prepolymer, RUBINATE® 9480. The (B) component was prepared by combining 50.0 parts of JEFFAMINE® D-2000, 9.0 parts of JEFFAMINE® T-5000, 7.8 parts of XTA-754, 19.8 parts of ETHACURE® 100, and 1.25 parts of UNILINK® 4200. The (A) and (B) components were mixed in the high-pressure, high-temperature, impingement-mix spray equipment, at an (A):(B) weight ratio of 1.14 and a volumetric ratio of 1.00. The resulting polyurea elastomer was sprayed onto a flat metal substrate coated with a sodium oleate based external mold release agent. A good coating resulted exhibiting a 6.0 second gel time, and a 13.0 second tack-free time.

EXAMPLE 5

The (A) component of a spray polyurea elastomer consisted of 97.56 parts of quasi-prepolymer, RUBINATE® 9480. The (B) component was prepared by combining 50.0 parts of JEFFAMINE® D-2000, 9.0 parts of JEFFAMINE® T-5000, 7.2 parts of XTA-754, 18.59 parts of ETHACURE® 100, and 3.85 parts of UNILINK® 4200. The (A) and (B) components were mixed in the high-pressure, high-temperature, impingement-mix spray equipment, at an (A):(B) weight ratio of 1.13 and a volumetric ratio of 1.00. The resulting polyurea elastomer was sprayed onto a flat metal substrate coated with a sodium oleate based external mold release agent. A good coating resulted exhibiting a 9.0 second gel time, and an 17.0 second tack-free time.

What is claimed is:

1. A process for producing an elastomeric polyurea comprising the steps of:
    a) providing an isocyanate component in a first storage vessel;
    b) providing an amine component in a second storage vessel, wherein said amine component includes an alkyl-substituted isophorone diamine, characterized as comprising a mixture of the amines:

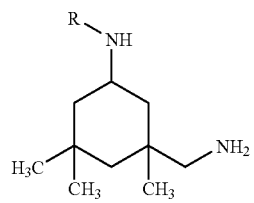

+

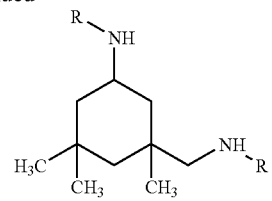

in which the N,N'-di- substituted material is present in any amount between 90.00% and 99.99% by weight based upon the total weight of the mixture, and in which R may represent any pendant group selected from the group consisting of: methyl; ethyl; 1-propyl; 1-butyl; 1-pentyl; 4-methyl-2-pentyl; 2-propyl; 2-butyl; 2-methyl-1-propyl; and cyclohexyl, in combination with at least one other amine useful in polyurea manufacture; and
    c) mixing a portion of the isocyanate component contained in said first storage vessel with a portion of the amine component contained in the second storage vessel so as to form a polyurea composition,
wherein the ratio of said isocyanate component to said amine component in the resultant polyurea is any ratio in the range of between 1.00:1.00 to 1.20:1.00.

2. A process according to claim 1 wherein said isocyanate component comprises a quasi-prepolymer of an isocyanate selected from the group consisting of: an aliphatic isocyanate; and an aromatic isocyanate, and an active hydrogen-containing material.

3. A process according to claim 2 wherein the active hydrogen-containing material is a polyol, a high molecular weight amine-terminated polyoxyalkylene polyol, or a mixture thereof.

4. A process for producing an elastomeric polyurea comprising the steps of:
    a) providing an isocyanate component in a first storage vessel;
    b) providing an amine component in a second storage vessel, wherein said amine component includes an alkyl-substituted isophorone diamine, characterized as comprising a mixture of the amines:

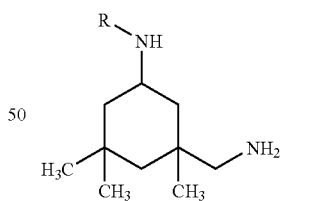

+

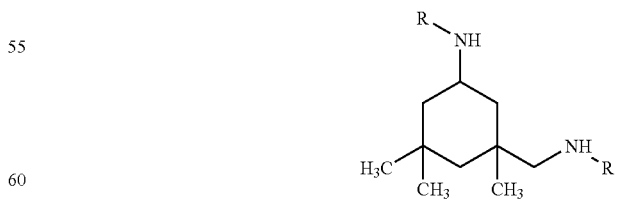

in which the N,N'-di- substituted material is present in any amount between 90.00% and 99.99% by weight based upon the total weight of the mixture, and in which R may represent any pendant group selected from the group consisting of: methyl; ethyl; 1-propyl; 1-butyl; 1-pentyl; 4-methyl-2-pentyl; 2-propyl; 2-butyl; 2-methyl-1-propyl; and cyclohexyl; said amine component further comprising at least one polyoxyalkylene polyalkylpolyamine of the formula:

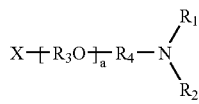

in which $R_1$ and $R_2$ are each independently selected from the group consisting of: hydrogen; an alkyl group having 1, 2, 3, 4, 5, or 6 carbon atoms, whether straight-chain or branched; or a radical of the formula:

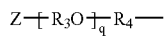

in which $R_3$ in each occurrence may be an alkyl group having any number of carbon atoms selected from 1, 2, 3, 4, 5, or 6, straight-chain or branched; $R_4$ in each occurrence is a straight-chain or branched alkyl bridging group having 1, 2, 3, 4, 5, or 6 carbon atoms; Z is a hydroxy group or alkyl group containing 1, 2, 3, 4, 5, or 6 carbon atoms, straight-chain or branched; q is any integer between 0 and 400; and wherein X is any of:

i) a hydroxy group or an alkyl group having any number of carbon atoms selected from 1, 2, 3, 4, 5, or 6; or

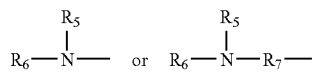

ii) a group $R_6$—N— or $R_6$—N—$R_7$— in which $R_5$ and $R_6$ are each independently selected from the group consisting of: hydrogen; an alkyl group having 1, 2, 3, 4, 5, or 6 carbon atoms, whether straight-chain or branched; or

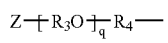

as defined above in which Z is a hydroxy group or an alkoxy group having 1, 2, 3, 4, 5, or 6 carbon atoms, and in which $R_7$ is a straight-chain or branched alkylene bridging group having 1, 2, 3, 4, 5, or 6 carbon atoms; or iii) a moiety of the formula:

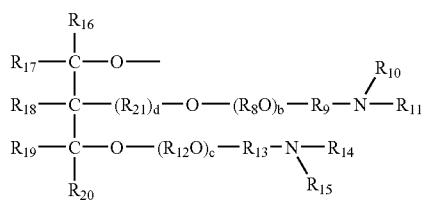

in which $R_{10}$, $R_{11}$, $R_{14}$, and $R_{15}$ are each independently selected from the group of: hydrogen; an alkyl group having 1, 2, 3, 4, 5, or 6 carbon atoms, straight-chain or branched; the moiety

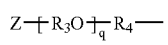

as defined above in which Z is a hydroxy or alkoxy group having 1, 2, 3, 4, 5, or 6 carbon atoms; $R_8$ and $R_{12}$ are each independently alkyl groups having 1, 2, 3, 4, 5, or 6 carbon atoms, straight-chain or branched; $R_9$, $R_{13}$, and $R_{21}$ are each independently selected from a straight-chain or branched alkyl bridging linkage having 1, 2, 3, 4, 5, or 6 carbon atoms; $R_{16}$, $R_{17}$, $R_{18}$, $R_{19}$, $R_{20}$ are each independently selected from hydrogen or an alkyl group having 1, 2, 3, 4, 5, or 6 carbon atoms; d is 0 or 1; a is any integer between 0 and 100, with the proviso that when X is a moiety of the formula given in iii) above, b and c may each independently be any integer in the range of 0 to 390, and the sum of a+b+c is any number between 2 and 400; and c) mixing a portion of the isocyanate component contained in said first storage vessel with a portion of the amine component contained in the second storage vessel so as to form a polyurea composition, wherein the ratio of said isocyanate component to said amine component in the resultant polyurea is any ratio in the range of between 1.00:1.00 to 1.20:1.00.

5. A process according to claim 4 wherein said isocyanate component comprises a quasi-prepolymer of an isocyanate selected from the group consisting of: an aliphatic isocyanate; and an aromatic isocyanate, and an active hydrogen-containing material.

6. A process according to claim 5 wherein the active hydrogen-containing material is a polyol, a high molecular weight amine-terminated polyoxyalkylene polyol, or a mixture thereof.

7. An elastomeric polyurea coating which is produced by:
a) providing an isocyanate component in a first storage vessel;
b) providing an amine component in a second storage vessel, wherein said amine component includes an alkyl-substituted isophorone diamine, characterized as comprising a mixture of the amines:

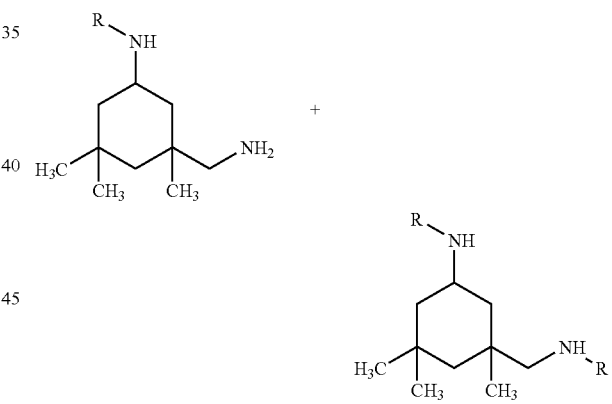

in which the N,N'-di- substituted material is present in any amount between 90.00% and 99.99% by weight based upon the total weight of the mixture, and in which R may represent any pendant group selected from the group consisting of: methyl; ethyl; 1-propyl; 1-butyl; 1-pentyl; 4-methyl-2-pentyl; 2-propyl; 2-butyl; 2-methyl-1-propyl; and cyclohexyl; said amine component further comprising at least one polyoxyalkylene polyalkylpolyamine of the formula:

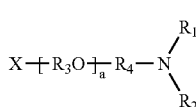

in which $R_1$ and $R_2$ are each independently selected from the group consisting of: hydrogen; an alkyl group having 1, 2, 3, 4, 5, or 6 carbon atoms, whether straight-chain or branched; or a radical of the formula:

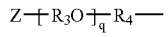

in which $R_3$ in each occurrence may be an alkyl group having any number of carbon atoms selected from 1, 2, 3, 4, 5, or 6, straight-chain or branched; $R_4$ in each occurrence is a straight-chain or branched alkyl bridging group having 1, 2, 3, 4, 5, or 6 carbon atoms; Z is a hydroxy group or alkyl group containing 1, 2, 3, 4, 5, or 6 carbon atoms, straight-chain or branched; q is any integer between 0 and 400; and wherein X is any of:

i) a hydroxy group or an alkyl group having any number of carbon atoms selected from 1, 2, 3, 4, 5, or 6; or

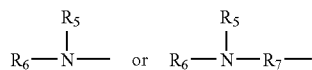

ii) a group $R_6$—N— or $R_6$—N—$R_7$— in which $R_5$ and $R_6$ are each independently selected from the group consisting of: hydrogen; an alkyl group having 1, 2, 3, 4, 5, or 6 carbon atoms, whether straight-chain or branched; or

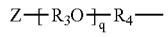

as defined above in which Z is a hydroxy group or an alkoxy group having 1, 2, 3, 4, 5, or 6 carbon atoms, and in which $R_7$ is a straight-chain or branched alkylene bridging group having 1, 2, 3, 4, 5, or 6 carbon atoms; or iii) a moiety of the formula:

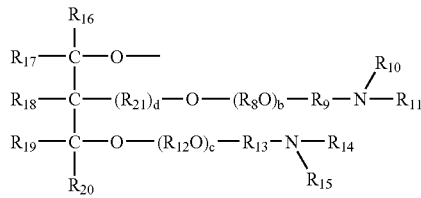

in which $R_{10}$, $R_{11}$, $R_{14}$, and $R_{15}$ are each independently selected from the group of: hydrogen; an alkyl group having 1, 2, 3, 4, 5, or 6 carbon atoms, straight-chain or branched; the moiety

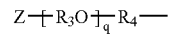

as defined above in which Z is a hydroxy or alkoxy group having 1, 2, 3, 4, 5, or 6 carbon atoms; $R_8$ and $R_{12}$ are each independently alkyl groups having 1, 2, 3, 4, 5, or 6 carbon atoms, straight-chain or branched; $R_9$, $R_{13}$, and $R_{21}$ are each independently selected from a straight-chain or branched alkyl bridging linkage having 1, 2, 3, 4, 5, or 6 carbon atoms; $R_{16}$, $R_{17}$, $R_{18}$, $R_{19}$, $R_{20}$ are each independently selected from hydrogen or an alkyl group having 1, 2, 3, 4, 5, or 6 carbon atoms; d is 0 or 1; a is any integer between 0 and 100, with the proviso that when X is a moiety of the formula given in iii) above, b and c may each independently be any integer in the range of 0 to 390, and the sum of a+b+c is any number between 2 and 400; and c) mixing a portion of the isocyanate component contained in said first storage vessel with a portion of the amine component contained in the second storage vessel so as to form a polyurea composition, wherein the ratio of said isocyanate component to said amine component in the resultant polyurea is any ratio in the range of between 1.00:1.00 to 1.20:1.00.

8. A coating according to claim 7 wherein said isocyanate component comprises a quasi-prepolymer of an isocyanate selected from the group consisting of: an aliphatic isocyanate; and an aromatic isocyanate, and an active hydrogen-containing material.

9. A coating according to claim 8 wherein the active hydrogen-containing material is a polyol, a high molecular weight amine-terminated polyoxyalkylene polyol, or a mixture thereof.

10. A process according to claim 1 wherein the N,N'-di-substituted material is present in at least the amount of 98.00% by weight by weight based upon the total weight of the mixture.

11. A process according to claim 4 wherein the N,N'-di-substituted material is present in at least the amount of 98.00% by weight by weight based upon the total weight of the mixture.

12. A coating according to claim 7 wherein the N,N'-di-substituted material is present in at least the amount of 98.00% by weight by weight based upon the total weight of the mixture.

* * * * *